US006661546B1

(12) United States Patent
Plett

(10) Patent No.: US 6,661,546 B1
(45) Date of Patent: Dec. 9, 2003

(54) MULTI-APERTURE HOLOGRAPHIC OPTICAL ELEMENT FOR ILLUMINATION SENSING IN A FREE SPACE OPTICAL COMMUNICATION SYSTEM

(75) Inventor: Mark L. Plett, Redmond, WA (US)

(73) Assignee: Terabeam Corporation, Kirkland, WA (US)

(*) Notice: Subject to any disclaimer, the term of this patent is extended or adjusted under 35 U.S.C. 154(b) by 105 days.

(21) Appl. No.: 10/112,534

(22) Filed: Mar. 28, 2002

(51) Int. Cl.[7] .................................................. G02B 5/32
(52) U.S. Cl. ............................... 359/15; 359/19; 359/1; 359/118; 359/122; 359/128; 359/129; 359/131; 359/135
(58) Field of Search .............................. 359/1, 15, 19, 359/34; 398/84, 118, 122, 128–131, 135, 138

(56) References Cited

U.S. PATENT DOCUMENTS

| 5,706,114 A | * | 1/1998 | Erteza .......................... 398/131 |
| 5,726,786 A | * | 3/1998 | Heflinger ...................... 398/128 |
| 5,933,551 A | | 8/1999 | Boudreau et al. |
| 6,154,297 A | | 11/2000 | Javitt et al. |
| 6,269,203 B1 | | 7/2001 | Davies et al. |
| 6,320,686 B1 | | 11/2001 | Schairer |
| 6,344,829 B1 | | 2/2002 | Lee |
| 6,347,001 B1 | | 2/2002 | Arnold et al. |
| 2003/0147652 A1 | * | 8/2003 | Green et al. ................. 398/118 |

* cited by examiner

Primary Examiner—Drew Dunn
Assistant Examiner—Fayez Assaf
(74) Attorney, Agent, or Firm—Blakely Sokoloff Taylor & Zafman, LLP

(57) ABSTRACT

A free space (FSO) receiver includes an illumination sensing unit with multiple illumination apertures. The illumination sensing unit is used in deriving alignment information from portion(s) of a received FSO signal that are incident on the illumination apertures. The FSO receiver provides this information to the FSO transmitter that transmitted the FSO signal so that the FSO transmitter can adjust the direction it is pointing. The illumination apertures can be formed in a holographic optical element on a single substrate. Further, transmission, reception, tracking and/or spotting scope apertures may be formed in the single substrate.

28 Claims, 3 Drawing Sheets

MULTI-APERTURE HOLOGRAPHIC OPTICAL ELEMENT FOR ILLUMINATION SENSING IN A FREE SPACE OPTICAL COMMUNICATION SYSTEM

CROSS-REFERENCE TO RELATED APPLICATIONS

The present application is related to U.S. patent application Ser. No. 09/886,246, entitled "Internal Reflection Apparatus and Method Using a Holographic Optical Element for a Free Space Optical Communication System" filed Jun. 20, 2001.

FIELD OF THE INVENTION

The field of invention relates generally to optical communication systems; and in particular but not exclusively, relates to holographic optical elements for use in optical communication systems.

BACKGROUND

With increasing popularity of wide area networks such as the Internet and/or World Wide Web, network growth and traffic have experienced tremendous growth. Network users continue to desire faster networks, which may be difficult to achieve using existing wired technologies.

An alternative to wired network solutions is a wireless or free space optical (FSO) communication technology. Such FSO systems can use beams of light, such as laser beams, as optical communication signals, and therefore do not require cables or fibers connected between transmitters and receivers.

FSO units (i.e., FSO transmitters, receivers, and transceivers) used in FSO communication systems typically include several separate optical elements for transmission, reception, tracking and acquisition of FSO signals. For example, some FSO units have multiple apertures, each having a lens. Other FSO units may have a single aperture with a lens and multiple beam splitters. Because these optical elements are relatively expensive, the cost of such a unit increases as more optical elements are incorporated into the unit. Further, these optical elements typically require relatively complex mechanisms to provide needed optical isolation between elements, which further increases costs (including design costs). In addition, as more optical elements are used in a unit, alignment and maintenance of the unit becomes more complex, thereby increasing costs and the "downtime" in maintaining the unit. Such increased costs and downtime are undesirable in many applications.

FSO Terminals may employ pointing and tracking systems to maintain alignment of the FSO link. The intent of these pointing and tracking systems is to optimize the optical power conveyed between the FSO terminals. There are many types of pointing and tracking systems. All of these systems require hardware additional to the communication channel in the FSO terminal. This additional hardware for a pointing and tracking system can also increase costs.

SUMMARY OF THE INVENTION

In accordance with aspects of the present invention, a FSO receiver of a FSO communication system is provided. The FSO receiver is arranged to receive a FSO signal from a FSO transmitter. In one aspect of the present invention, the FSO receiver includes an illumination sensing unit used in deriving alignment information from portion(s) of the FSO signal incident on illumination apertures of the FSO receiver. The FSO receiver provides this information to the FSO transmitter. The FSO transmitter uses the information to adjust it pointing direction (i.e., the direction that it transmits FSO signals).

In another aspect, the illumination apertures are formed in a holographic optical element (HOE) having apertures for other features of the FSO receiver. For example, the HOE may also include reception and tracking apertures. In some embodiments, the FSO receiver in incorporated in a transceiver. In such embodiments, the HOE can also include a transmission aperture (which may include component apertures).

In yet another aspect, the multiple apertures are formed in a single substrate of the HOE. This aspect can advantageously reduce the complexity and cost of the optics unit used in the FSO receiver.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

An optical communication system according to an embodiment of the present invention has two optical units for transmitting and receiving a FSO signal. In a typical operation of the optical communication system, one optical unit transmits an FSO signal containing communication information. The other optical unit receives the FSO signal. The receiving optical unit includes a communications detector for extracting the communication information from the received optical signal, and a tracking detector used in maintaining alignment between the receiving optical unit and the FSO signal. In an embodiment of the present invention, the receiving optical unit includes a multi-aperture HOE to direct portions of the FSO signal to communications and tracking detectors. Embodiments of optical units and multi-aperture HOEs according to the present invention are described below.

Figure 1:
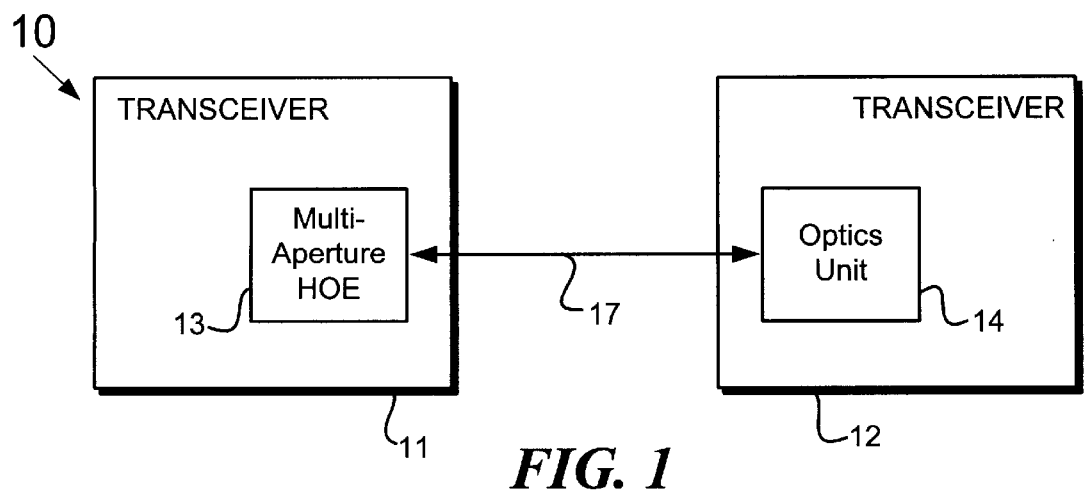
FIG. 1 is a block diagram illustrating a free space optical (FSO) communication system with a multi-aperture holographic optical element (HOE), according to one embodiment of the present invention.

FIG. 1 illustrates a FSO communication system 10, according to one embodiment of the present invention. In this embodiment, FSO communication system 10 includes transceivers 11 and 12. Although only two transceivers are shown, other embodiments of FSO communication system 10 may include additional transceivers, transmitters and/or receivers. In addition, in other embodiments, a FSO transmitter or FSO receiver can be used instead of transceivers (e.g., in a unidirectional communication systems).

In accordance with the embodiments of the present invention, transceiver 11 includes a multi-aperture HOE 13. Multi-aperture HOE 13 is used in place of a conventional optics unit in this embodiment. Transceiver 12 includes an optics unit 14, which can be a conventional optics unit as described above, or a multi-aperture HOE similar to multi-aperture HOE 13.

In one embodiment, transceivers 11 and 12 are similar to known FSO transceivers that do not include multi-aperture HOEs, available from Terabeam Corp., Kirkland, Washington. However, transceiver 11 includes multi-aperture HOE 13 (instead of a conventional optics unit) that provides apertures used for various functions of transceiver 11 that can include, for example, transmission, reception, tracking and acquisition.

Transceiver 11 is operatively coupled to transceiver 12 in that these transceivers communicate with each other via a FSO signal indicated by a double-headed arrow 17 (hereinafter FSO signal 17). More particularly, in this embodiment multi-aperture HOE 13 of transceiver 11 is operatively coupled to optics unit 14 of transceiver 12 via FSO signal 17. In some instances, for example, transmitter 11 transmits FSO signal 17 while in other instances transceiver 12 transmits FSO signal 17. Although these transmissions are described as being unidirectional at a given instant, in some embodiments FSO signal 17 includes two unidirectional FSO signals, one from transceiver 11 and one from transceiver 12 that transceivers 11 and 12 may transmit simultaneously.

In basic operation during a receive mode, transceiver 11 can receive FSO signal 17 from optical receiver 12. As previously described, FSO signal 17 can be in the form of a laser beam having data modulated thereon. For example, FSO signal 17 may be a laser beam with a wavelength ranging between 500 nm and 2000 nm that is modulated using OOK (on-off keying) modulation, as is commonly used in optical communication systems. Other embodiments may use differently modulation techniques and/or radiation of different wavelengths that are suitable for the intended application.

Transceiver 11 can use a portion of FSO signal 17 in demodulating the signal to extract the data, as is commonly done in conventional optical receivers. Typically, a relatively large portion of the incoming optical signal is used to extract the data. In one embodiment, multi-aperture HOE 13 includes a reception aperture (e.g., see FIG. 2) to receive this portion of FSO signal 17. For example, the reception aperture may implement a holographic focusing element to focus the portion of FSO signal 17 onto a communications detector (e.g., a photodiode or other suitable photodetector).

In addition, transceiver 11 can use another portion of FSO signal 17 in tracking FSO signal 17 to help in maintaining alignment between transceiver 11 and FSO signal 17. In this embodiment, multi-aperture HOE 13 includes a tracking aperture to receive this other portion of FSO signal 17. For example, the tracking aperture may implement a holographic focusing element to focus the portion of FSO signal 17 onto a tracking detector (e.g., a quad cell detector).

In basic operation during a transmit mode, transceiver 11 can transmit FSO signal 17 to transceiver 12. In one embodiment, multi-aperture HOE 13 includes a transmission aperture (e.g., see FIG. 2) to transmit FSO signal 17. For example, transmission aperture may implement a holographic focusing element to collimate FSO signal 17 as it leaves transceiver 11.

Multi-aperture HOE 13 provides several advantages over the previously described conventional optics units. For example, a single unit is used to aggregate several optical elements, thereby tending to reduce cost and complexity. In addition, because HOEs can be manufactured using photolithographic techniques, alignment and sizing of the apertures can be precisely controlled at manufacture. Still further, optical designs can be easily implemented by a relatively simple change in the HOE exposure process. Further, installation of a replacement HOE (for example, due to updated design or to replace a damaged HOE) can be relatively easy because the HOE can more easily be designed to match the size and shape of the original HOE.

Figure 2:
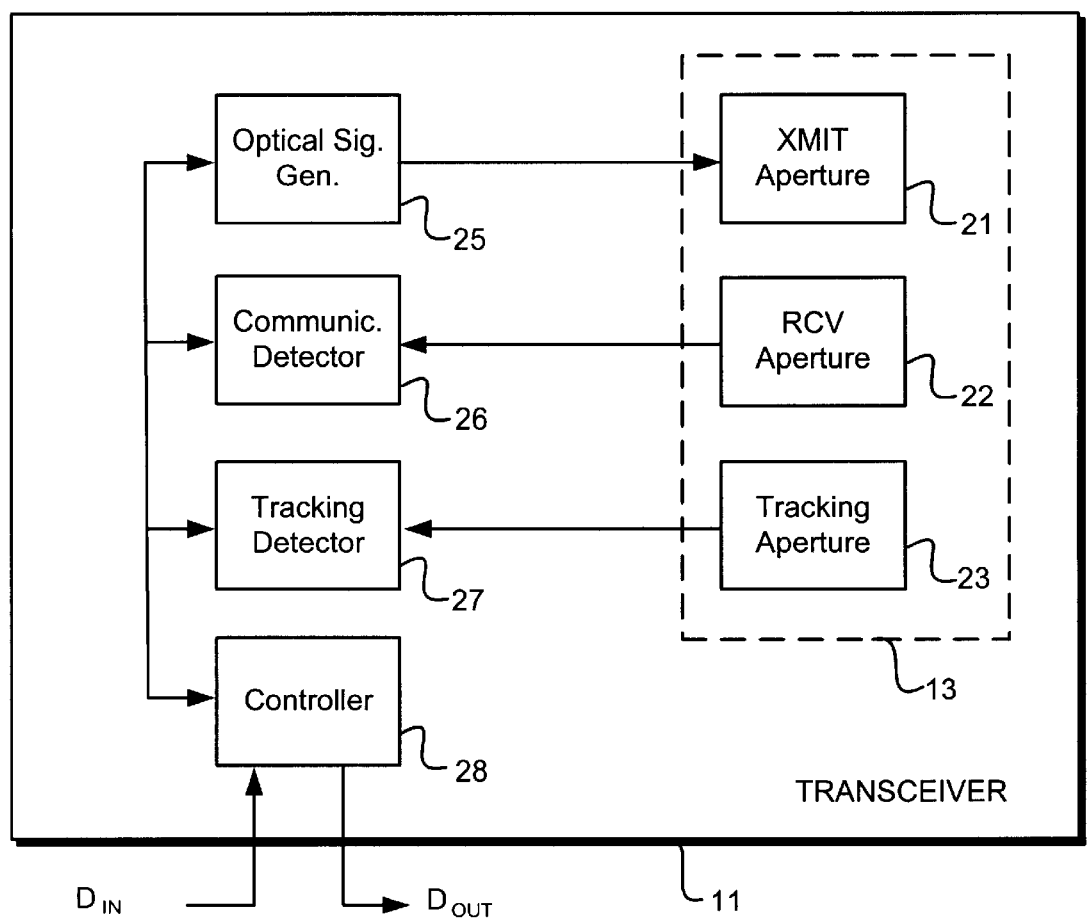
FIG. 2 is a block diagram illustrating a FSO transceiver, according to one embodiment of the present invention.

FIG. 2 illustrates FSO transceiver 11 (FIG. 1) in more detail, according to one embodiment of the present invention. In this embodiment, multi-aperture HOE 13 includes a transmission aperture 21, a reception aperture 22 and a tracking aperture 23. As previously described, apertures 21–23 may be holographic interference patterns that implement optical elements such as, for example, focusing lens, collimating lens, etc. In addition, these apertures may be implemented as multiple component apertures. For example, transceiver 11 may transmit an optical signal to transceiver 12 (FIG. 1) via several apertures distributed across the face of multi-aperture HOE 13.

In addition, this embodiment of FSO transceiver 11 includes an optical signal generator 25, a communications detector 26, a tracking detector 27 and a controller 28. In one embodiment, optical signal generator 25 is a laser generating a laser beam having a wavelength of 1540 nm. Communications detector 26, in one embodiment, is implemented using a photodiode such as, for example, a PIN photodiode, or an avalanche photodiode (APD). Tracking detector 27 is implemented using a multi-cell detector such as a quad cell detector in some embodiments. In other embodiments, tracking detector can be implemented with other types of optical position sensors devices such as a charge-coupled device (CCD) or photo-detector array (PDA). Controller 28, in this embodiment, is implemented with one or more processors (not shown) and a memory (not shown). The processor(s) can be, for example, a general-purpose microprocessor, microcontroller or digital signal processor. The memory can store data and instructions (e.g., computer programs) used by the processor(s) to control the operation of transceiver 11.

The elements of this embodiment of transceiver 11 are interconnected as follows. Optical signal generator 25, communications detector 26 and tracking detector 27 are operatively coupled to transmission aperture 21, reception aperture 22 and tracking aperture 23, respectively. For example, optical signal generator 25 is operatively coupled to transmission aperture 21 in that optical signal generator 25 is arranged to provide an optical signal to transmission aperture 21. In addition, controller 28 is coupled to optical signal generator 25, communications detector 26 and tracking detector 27.

In operation during a transmit mode, optical signal generator 25 generates an optical signal and directs it to transmission aperture 21. In one embodiment, transmission aperture 21 launches the optical signal into free space.

For example, controller 28 can be configured to cause optical signal generator 25 to embed or modulate data (e.g., data $D_{IN}$ in FIG. 2) in the optical signal generated by optical signal generator 25, as is commonly done in known optical transceivers.

In operation during a receive mode, communications detector 26 receives an optical signal via reception aperture 22. For example, the optical signal from reception aperture 22 can be a portion of FSO signal 17 (FIG. 1) transmitted by transceiver 12 (FIG. 1). In this embodiment, reception aperture 22 is configured to focus the received optical signal onto communications detector 26.

In addition, tracking detector 27 receives an optical signal via tracking aperture 23. The optical signal from tracking aperture 23 can be another portion of FSO signal 17 (FIG. 1) transmitted by transceiver 12 (FIG. 1). In this embodiment, tracking aperture 23 is configured to focus the received optical signal onto tracking detector 27.

In one embodiment, controller 28 can be configured to extract communications (e.g., data $D_{OUT}$ in FIG. 2) and tracking information from the output signals of communications detector 26 and tracking detector 27, as is common done in known optical transceivers. Controller 28 can use the tracking information to maintain alignment between transceiver 11 and FSO signal 17 (FIG. 1).

Figure 3:
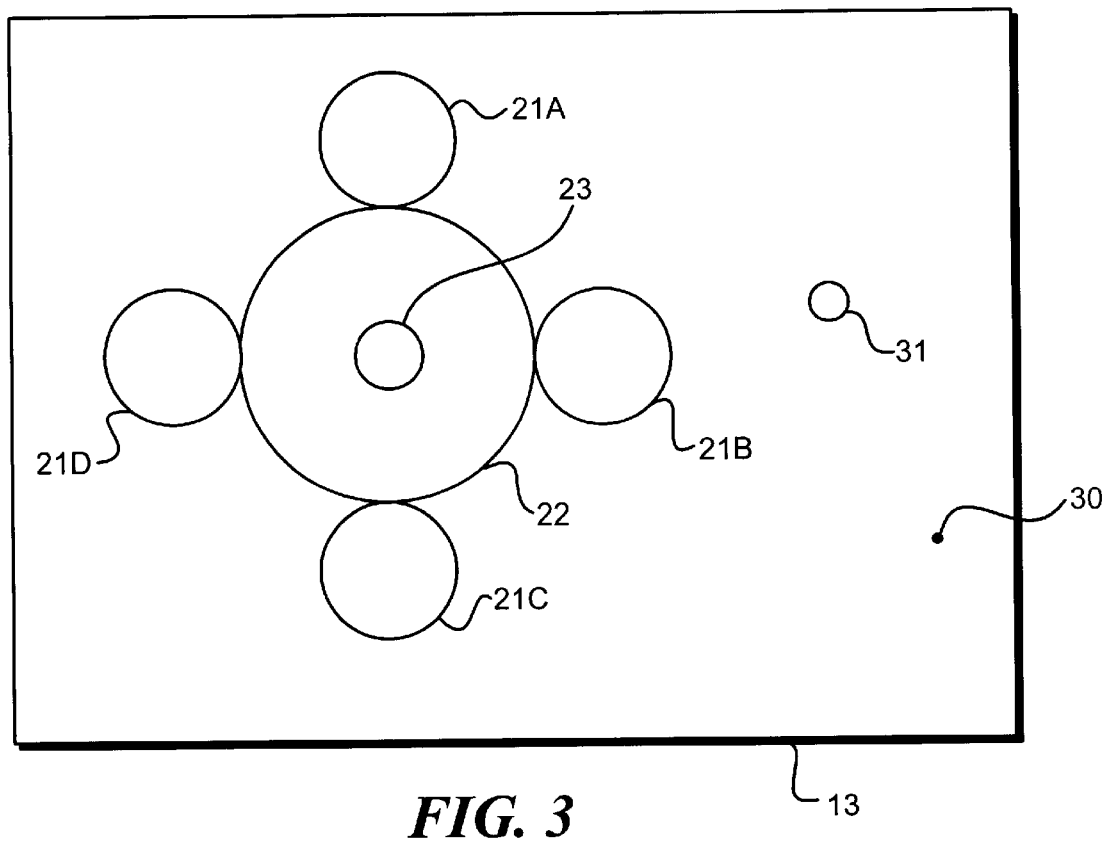
FIG. 3 is a diagram illustrating a layout of a multi-aperture HOE, according to one embodiment of the present invention.

FIG. 3 illustrates a layout of multi-aperture HOE 13, according to one embodiment of the present invention. In this embodiment, multi-aperture HOE 13 is formed (or recorded) in a single substrate 30. Various materials can be used for substrate 30 such as, for example, photopolymer materials, dichromated gelatins or other optical gelatins. Such materials are commercially available. Holograms implementing the various apertures are then recorded in substrate 30.

For example, in one embodiment, substrate 30 is masked so that only the intended aperture will be exposed during the recording process. In the recording process, a reference beam and an information beam, are directed to the substrate, thereby recording an interference pattern in the substrate. The interference pattern can implement a diffraction grating, for example in the substrate. This diffraction grating can be designed, for example, to diffract incident light of a selected wavelength toward a focus, thereby implementing a lens. Other optical elements can be designed in a similar manner. This process can then be repeated for each aperture.

In this embodiment of multi-aperture HOE 13, the receiving surface of reception aperture 22 has an annular shape. Tracking aperture 23 is recorded in the central void area of this annulus. This arrangement can be advantageously used in systems in which the received beam has a central peak in its energy distribution (e.g., a Gaussian distribution). This arrangement will provide the most uniform illumination of the tracking sensor thereby reducing errors due to illumination variations. In other embodiments, reception and/or tracking apertures 22 and 23 may have different shapes and/or locations on substrate 30. For example, reception aperture 22 may have a partially annular receiving area with tracking aperture 23 being disposed in the central void area of the partial annulus. In another example, tracking aperture 23 may be formed with component apertures disposed symmetrically about reception aperture 22.

In this embodiment, transmission aperture 21 (FIG. 2) is implemented with four component apertures 21A–21D. Component apertures 21A–21D are uniformly distributed around the periphery of reception aperture 22. Such a distributed transmission aperture can advantageously reduce scintillation of the transmitted optical signal as received by transceiver 12 (FIG. 1). Although component apertures 21A–21D are shown in a symmetrical arrangement about reception aperture 22, in other embodiments, component apertures may be disposed in other arrangements and/or locations on substrate 30.

Figure 4:
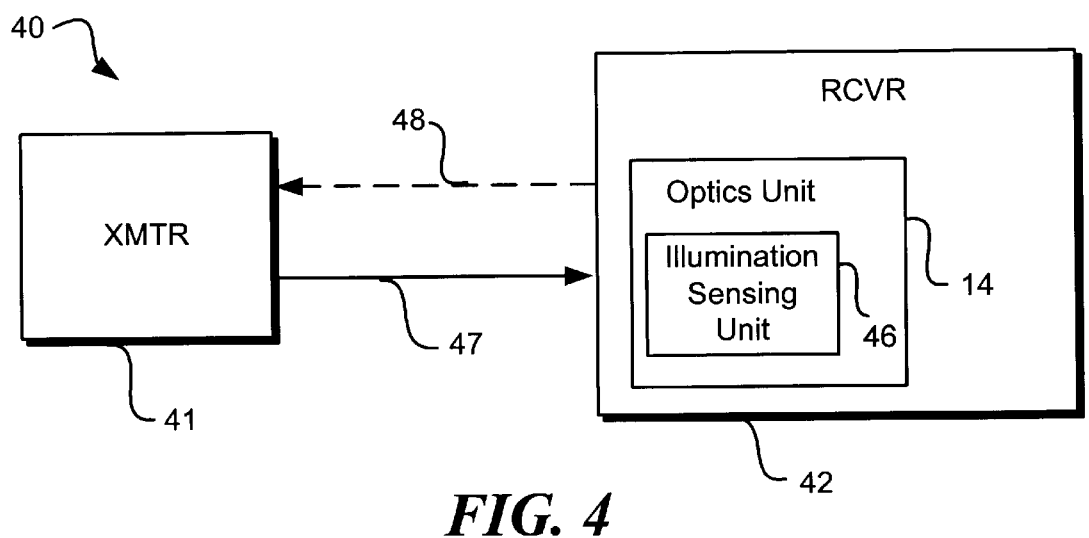
FIG. 4 is a block diagram illustrating a FSO communication system with an illumination-sensing unit, according to one embodiment of the present invention.

In addition, in this embodiment, multi-aperture HOE 13 includes a spotting aperture for use in a spotting scope (not shown). In one embodiment, this spotting scope could be implemented with a plano-convex lens bonded to the HOE substrate, which images the field of view onto a CCD array. Such a spotting scope can be used during installation of transceiver 11 to initially point transceiver 11 at transceiver 12 (FIG. 1). This process is also referred to herein as the acquisition process FIG. 4 illustrates a FSO communication system 40 with illumination sensing, according to one embodiment of the present invention. In this embodiment, FSO communication system 40 includes a FSO transmitter 41 and a FSO receiver 42. In this embodiment, FSO transmitter 41 uses known techniques to output a FSO signal that is modulated with communications data. In some embodiments, FSO transmitter 41 and FSO receiver 42 are incorporated into FSO transceivers.

In this embodiment, FSO receiver 42 includes optics unit 14 (e.g., as in FIG. 1), which in turn includes an illumination sensing unit 46. Illumination sensing unit 46 is used to determine and provide information to the opposing FSO transmitter 41 so that FSO transmitter 41 can adjust its position (e.g., angular position) to transmit an optical signal to FSO receiver 42 with a desired alignment.

In this embodiment, Illumination sensing unit 46 includes multiple illumination apertures. These illumination apertures are distributed across a receiving surface of optics unit 14. For example, the illumination apertures can be symmetrically distributed about a reception aperture of optics unit 14. In this embodiment, the illumination apertures focus incident portions of FSO signal 47 onto optical detectors (not shown). Each of these optical detectors generates an output signal as a function of the energy of the light incident on that particular optical detector.

The elements of FSO communication system 40 are operatively interconnected as follows. FSO transmitter 41 communications with FSO receiver 42 via a FSO signal 47. In addition, in embodiments in which FSO transmitter 41 and FSO receiver 42 are incorporated into transceivers, FSO receiver 42 can communicate with FSO transmitter 41 via a signal 48. Signal 48 is a FSO signal in one embodiment.

FSO signal 47 is received at optics unit 14, which in this embodiment includes optics for receiving and tracking in addition to illumination sensing unit 46. The optics for receiving and tracking, in this embodiment, are implemented in a HOE (not shown) similar to multi-aperture HOE 13 (FIG. 2). In this embodiment, the receiving and tracking operations are performed as described above for transceiver 11 (FIG. 2). That is, this embodiment of FSO receiver 42 includes communications receiver 26 (FIG. 2), tracking detector 27 (FIG. 2) and controller 28 (FIG. 2). Further, in this embodiment, the multi-aperture HOE includes illumination apertures (not shown) of illumination sensing system 46. In some alternative embodiments, the optics for receiving and tracking are not implemented in a multi-aperture HOE.

Figure 5:
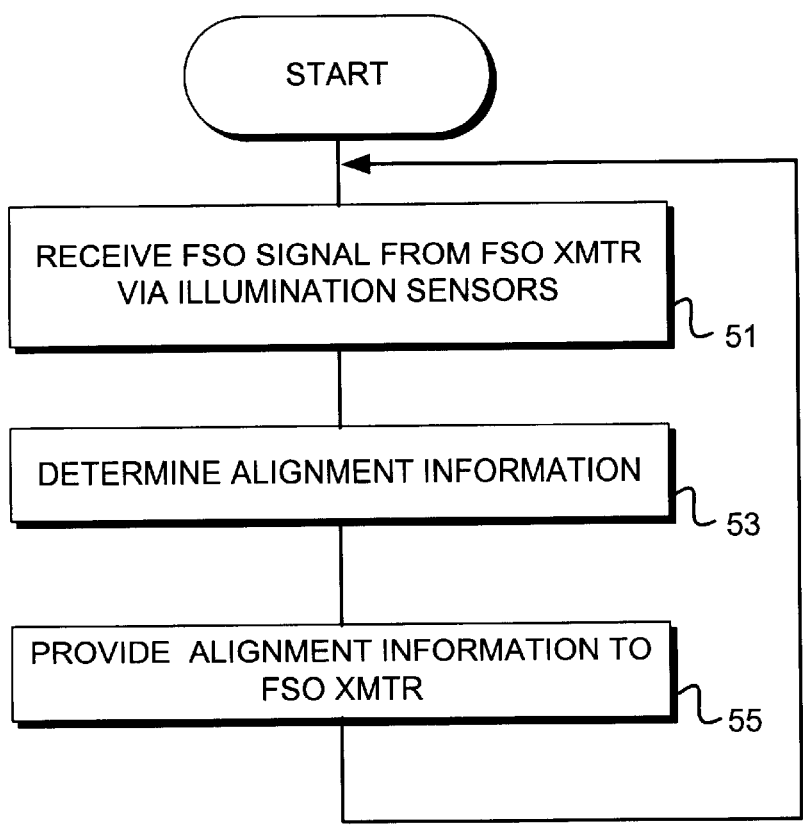
FIG. 5 is a flow diagram illustrating the operational flow of the illumination-sensing unit of FIG. 4, according to one embodiment of the present invention.

FIG. 5 illustrates an operational flow of FSO receiver 42 (FIG. 4), according to one embodiment of the present invention. Referring to FIGS. 4 and 5, this embodiment of FSO receiver 42 performs illumination sensing as follows. Optics unit 14 receives FSO signal 47 and processes portions of the received FSO signal as described above in conjunction with FIG. 2. In addition, Illumination sensing unit 46 receives a portion of FSO signal 47. More particularly, portions of FSO signal 47 may be incident on the illumination apertures distributed across the receiving surface of optics unit 14 (e.g., see FIG. 6 described below). A block 51 represents this operation.

Alignment information is then determined from the output signals of the optical detectors associated with the illumination apertures. In one embodiment, controller 28 (FIG. 2) receives the output signals from the optical detectors and determines alignment information to be used by FSO transmitter 41 in correcting the direction that it sends FSO signal 47. For example, illumination sensing unit 46 may include four apertures and optical detectors, with the alignment information being determined in a way that is similar to determining tracking information using a quad cell detector. However, illumination sensing alignment is based in the power delivered to the receiver rather than the angle of arrival of the receive beam as is the case for quadrant detectors. A block 53 represents this operation.

The determined alignment information is then provided to FSO transmitter 41. In some embodiments, FSO transmitter 41 and FSO receiver 42 are incorporated in transceivers. In such embodiments, the transceiver containing FSO receiver 42 provides this alignment information to FSO transmitter 41 via signal 48, which can be an FSO signal. In other embodiments, FSO receiver 42 can provide the alignment information to FSO transmitter using different types of links. A block 55 represents this operation. The operational flow then returns to block 51.

Figure 6:
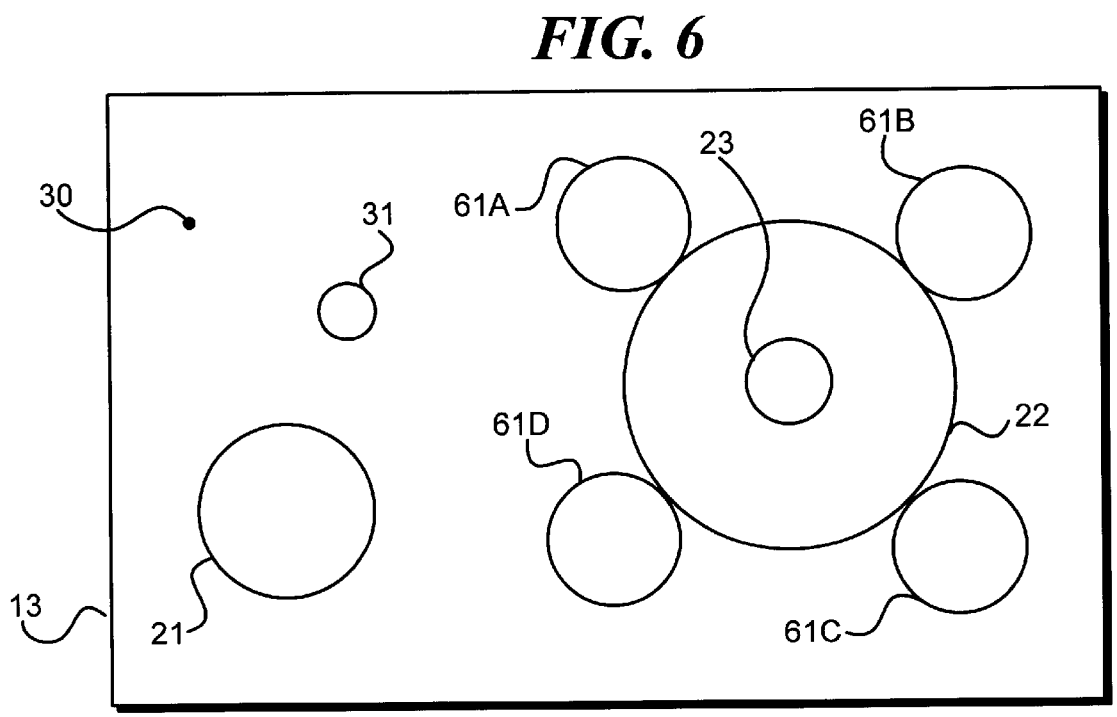
FIG. 6 is a diagram illustrating a layout of a multi-aperture HOE with illumination apertures, according to one embodiment of the present invention.

FIG. 6 illustrates a layout of multi-aperture HOE 13 for use with illumination sensing unit 46 (FIG. 4), according to one embodiment of the present invention. This embodiment of multi-aperture HOE 13 is similar to the embodiment described above in conjunction with FIG. 3 in that this embodiment includes transmission, receiving, tracking and spotting scope apertures 21, 22, 23, and 31 formed in single substrate 30. In this embodiment, however, transmission aperture 21 is implemented as a single aperture positioned relatively far apart from reception aperture 22. Further, this embodiment of multi-aperture HOE 13 includes illumination apertures 61A–61D. Other embodiments may use a different number of illumination apertures.

In this embodiment, illumination apertures 61A–61D are uniformly distributed around the periphery of reception aperture 22. As previously described, such a distribution of illumination apertures can advantageously reduce the risk of aligning on a local maximum rather than the true maximum. Although illumination apertures 61A–61D are shown in a symmetrical arrangement about reception aperture 22, in other embodiments, illumination apertures may be disposed in other arrangements and/or locations on substrate 30.

Embodiments of method and apparatus for an FSO receiving unit and illumination sensing unit are described herein. In the above description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, the invention has been described with reference to specific exemplary embodiments thereof. It will, however, be evident that various modifications and changes may be thereto without departing from the broader spirit and scope of the invention as set forth in the appended claims. The specification and drawings are, accordingly, to be regarded in an illustrative rather than a restrictive sense.

What is claimed is:

1. An holographic optical element (HOE) for use in receiving a free space optical signal from an optical transmitter, the HOE comprising:

a substrate;

a first aperture formed in the substrate, and a plurality of second apertures formed in the substrate, wherein each aperture of the plurality of second apertures is operatively coupled to an associated optical detector of a plurality of optical detectors, wherein information related to output signals of the plurality of optical detectors is used to adjust an alignment of the optical transmitter.

2. The HOE of claim 1 wherein each aperture of the plurality of second apertures includes a holographic focusing element.

3. The HOE of claim 1 wherein the first aperture is operatively couplable to a communications detector.

4. The HOE of claim 1 wherein the substrate includes a third aperture operatively couplable to a tracking detector.

5. The HOE of claim 4 wherein the first aperture has a receiving surface that at least partially surrounds a receiving surface of the third aperture.

6. The HOE of claim 1 wherein the substrate includes a fourth aperture operatively couplable to a spotting scope.

7. The HOE of claim 1 wherein the substrate includes a fifth aperture operatively couplable to an optical signal generator.

8. A receiving unit for receiving a free space optical signal from an optical transmitter, the receiving unit comprising:

a holographic optical element (HOE) having a substrate with a first aperture and a plurality of second apertures;

a first detector operatively coupled to the first aperture;

a plurality of second detectors operatively coupled to the plurality of second apertures; and a controller coupled to the first detector and the plurality of second detectors, wherein the controller is configured to provide information to the optical transmitter derived from an energy distribution of the optical signal as received by the plurality of second detectors.

9. The receiving unit of claim 8 wherein the first detector comprises a communications detector.

10. The receiving unit of claim 8 further comprising a third detector operatively coupled to a third aperture of the HOE.

11. The receiving unit of claim 10 wherein the third detector comprises a tracking detector.

12. The receiving unit of claim 8 wherein the receiving unit is part of a transceiver.

13. The receiving unit of claim 12 wherein the HOE further comprises a fourth aperture and an optical signal generator operatively coupled to the fourth aperture.

14. The receiving unit of claim 13 wherein the fourth aperture comprises a plurality of component apertures.

15. A transceiver for receiving a free space optical (FSO) signal from an optical transmitter, the transceiver comprising:
- holographic means for directing optical communication signals, the holographic means having a substrate with a first aperture, a second aperture and a plurality of third apertures;
- an optical signal generator operatively coupled to the first aperture;
- a communications detector operatively coupled to the second aperture;
- a plurality of illumination detectors operatively coupled to the plurality of third apertures; and
- a controller coupled to the optical signal generator, the communications detector and the plurality of illumination detectors, wherein the controller is configured to provide information to the optical transmitter derived from portions of the FSO signal incident on the plurality of third detectors.

16. The transceiver of claim 15 wherein the first aperture comprises a plurality of component apertures.

17. The transceiver of claim 15 wherein the controller is configurable to extract communications data contained in the FSO signal from a portion of the FSO signal incident on the second aperture.

18. The transceiver of claim 15 further comprising a tracking detector operatively coupled to a fourth aperture of the HOE.

19. The transceiver of claim 18 wherein the controller is configurable to adjust a position of the transceiver from an energy distribution of a portion of the FSO signal incident on the fourth aperture.

20. A method for use in receiving a free space optical (FSO) signal from an optical transmitter unit of an optical communication system, the method comprising:
- receiving the FSO signal using a first aperture and a plurality of second apertures;
- extracting communications data from a portion of the FSO signal incident on the first aperture
- deriving information related to the FSO signal's direction of propagation from portions of the FSO signal incident on the plurality of second apertures; and
- providing the information to the optical transmitter unit.

21. The method of claim 20 wherein the first aperture and the plurality of second apertures are formed in a single substrate of a holographic optical element.

22. The method of claim 21 further comprising transmitting an output signal into free space using a third aperture formed in the substrate.

23. An apparatus for use in receiving a free space optical (FSO) signal from an optical transmitter unit of an optical communication system, the apparatus comprising:
- holographic receiving means for receiving the FSO signal, the holographic receiving means having a first aperture and a plurality of second apertures;
- means for extracting communications data from a portion of the FSO signal incident on the first aperture;
- means for deriving information related to the FSO signal's direction of propagation from portions of the FSO signal incident on the plurality of second apertures; and
- means for providing the information to the optical transmitter unit.

24. The apparatus of claim 23 wherein the receiving means comprises a holographic optical element (HOE) having a substrate with the first aperture and the plurality of second apertures formed therein.

25. The apparatus of claim 24 further comprising means for transmitting an output signal into free space using a third aperture formed in the substrate.

26. A free space optical communication system, comprising:
- a first optical unit to provide a free space optical (FSO) signal containing communications data; and
- a second optical unit arranged to receive the FSO signal via free space from the first optical unit, wherein the second optical unit includes:
  - a holographic optics unit having a first aperture and a plurality of second apertures,
  - a communications detector operatively coupled to the first aperture,
  - a plurality of optical detectors operatively coupled to the plurality of second apertures, and
  - a controller coupled to the communications detector and the plurality of optical detectors, wherein the controller is configured to derive information related to the FSO signal's direction of propagation from portions of the FSO signal incident on the plurality of second apertures.

27. The system of claim 26 wherein the optics unit comprises a holographic optical element (HOE) having a substrate with the first aperture and the plurality of second apertures formed therein.

28. The system of claim 27 wherein the second unit further comprises an optical signal generator to transmit an optical signal into free space via a fourth aperture formed in the substrate of the HOE.

* * * * *